United States Patent
Cardwell et al.

(10) Patent No.: US 11,796,102 B2
(45) Date of Patent: Oct. 24, 2023

(54) QUICK CONNECTOR WITH MODULAR FLOW CONTROL INSERT

(71) Applicant: Cooper-Standard Automotive, Inc., Northville, MI (US)

(72) Inventors: Brian James Cardwell, Ypsilanti, MI (US); Scott Constine, Rochester Hills, MI (US); Robert Dennany, Lapeer, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/537,938

(22) Filed: Nov. 30, 2021

(65) Prior Publication Data

US 2022/0235890 A1     Jul. 28, 2022

Related U.S. Application Data

(60) Provisional application No. 63/141,929, filed on Jan. 26, 2021.

(51) Int. Cl.
*F16L 37/12* (2006.01)
*F16L 37/38* (2006.01)
*F16L 43/00* (2006.01)

(52) U.S. Cl.
CPC ........... *F16L 37/1225* (2013.01); *F16L 37/38* (2013.01); *F16L 43/008* (2013.01)

(58) Field of Classification Search
CPC ..... F16L 37/1225; F16L 43/008; F16L 37/38; F16L 29/00; F16L 37/144; F16L 37/0841; F16L 37/28; F16L 43/00; F16K 27/0209; F16K 2200/502; F16K 15/04
See application file for complete search history.

(56) References Cited

U.S. PATENT DOCUMENTS

| | | | |
|---|---|---|---|
| 3,362,280 | A | 1/1968 | Muller |
| 3,712,655 | A | 1/1973 | Fuehrer |
| 3,871,430 | A | 3/1975 | Meyer |
| 4,632,608 | A | 12/1986 | Blomberg et al. |
| 4,780,037 | A | 10/1988 | Payne |
| 4,811,753 | A * | 3/1989 | Bethune .................. F16K 24/04 4/209 R |
| 4,911,594 | A | 3/1990 | Fisher |
| 5,065,782 | A | 11/1991 | Szlaga |
| 5,098,242 | A | 3/1992 | Schaty |

(Continued)

FOREIGN PATENT DOCUMENTS

| DE | 8711730 U1 | 11/1987 |
|---|---|---|
| EP | 0648637 A1 | 4/1995 |

(Continued)

OTHER PUBLICATIONS

"Search Report for COO045-EP", dated Jun. 7, 2022.
"Search Report for COO045-EP dated Jun. 10, 2022".

*Primary Examiner* — James M Hewitt, II
(74) *Attorney, Agent, or Firm* — Paschall & Associates, LLC; James C. Paschall

(57) ABSTRACT

An assembly, connector and process for a quick connector includes a receptacle having first and second interior passages including a chamber in fluid communication between the first and second passages. A flow control insert is installed in the chamber to regulate fluid flow between the first and the second passage.

17 Claims, 4 Drawing Sheets

(56) References Cited

U.S. PATENT DOCUMENTS

| | | | |
|---|---|---|---|
| 5,106,223 A | 4/1992 | Kraus | |
| 5,280,876 A * | 1/1994 | Atkins | A61M 39/26 |
| | | | 604/905 |
| 5,291,639 A | 3/1994 | Baum et al. | |
| 5,318,069 A | 6/1994 | Harris | |
| 5,333,606 A * | 8/1994 | Schneider | A61M 16/0463 |
| | | | 285/332.1 |
| 5,392,804 A | 2/1995 | Kondo et al. | |
| 5,535,772 A | 7/1996 | Roetker et al. | |
| 5,687,778 A | 11/1997 | Harris | |
| 5,782,597 A | 7/1998 | Meyer | |
| 6,029,685 A * | 2/2000 | Carruth | F16K 27/0209 |
| | | | 137/533.15 |
| 6,035,884 A | 3/2000 | King et al. | |
| 6,276,387 B1 | 8/2001 | Pachciarz et al. | |
| 6,311,675 B2 | 11/2001 | Crary et al. | |
| 6,336,466 B1 | 1/2002 | Ganachaud et al. | |
| 6,354,564 B1 | 3/2002 | Van Scyoc et al. | |
| 6,508,269 B2 * | 1/2003 | Szabo | F16L 37/407 |
| | | | 137/515.5 |
| 6,802,491 B1 * | 10/2004 | Kelly | F16L 37/144 |
| | | | 251/149.6 |
| 7,066,701 B2 | 6/2006 | Kovac | |
| 7,249,595 B2 | 7/2007 | Mills et al. | |
| 8,191,932 B2 | 6/2012 | Davis | |
| 8,291,929 B2 | 10/2012 | Greene et al. | |
| 8,328,488 B2 | 12/2012 | Luk | |
| 8,979,461 B2 | 3/2015 | Pearson | |
| 9,309,033 B2 | 4/2016 | Dorsey et al. | |
| 9,586,475 B2 | 3/2017 | Honda et al. | |
| 10,125,908 B2 | 11/2018 | Kujawski, Jr. | |
| 11,549,613 B2 * | 1/2023 | Rabhi | F16K 99/0023 |
| 2009/0167018 A1 | 7/2009 | Lien | |
| 2016/0238173 A1 * | 8/2016 | Kujawski, Jr. | F16L 37/413 |
| 2017/0167619 A1 * | 6/2017 | Driscoll | F16K 27/0209 |
| 2019/0383432 A1 * | 12/2019 | Greco | F16L 41/021 |
| 2022/0252180 A1 * | 8/2022 | Mendez | F16K 11/161 |

FOREIGN PATENT DOCUMENTS

| | | |
|---|---|---|
| EP | 0773128 B1 | 7/2000 |
| EP | 1348090 | 7/2002 |
| EP | 1199207 A3 | 10/2003 |
| FR | 2346592 A1 | 10/1977 |
| FR | 2382607 A1 | 9/1978 |
| GB | 1149268 A | 4/1969 |
| JP | H07110082 B2 | 11/1995 |
| WO | 2021191822 A1 | 9/2021 |

* cited by examiner

QUICK CONNECTOR WITH MODULAR FLOW CONTROL INSERT

REFERENCE TO RELATED APPLICATIONS

This application claims priority under 35 U.S.C. § 119(e) to U.S. Provisional Patent Application No. 63/141,929 filed on Jan. 26, 2021. This provisional application is hereby incorporated by reference in its entirety.

TECHNICAL FIELD

This disclosure is generally directed to quick connectors. More specifically, this disclosure is directed to a quick connector having a modular flow control insert.

BACKGROUND

Quick connectors are often used in applications where it is necessary to connect and disconnect fluid lines with some regularity. In certain applications, the quick connector is provided with a flow control device, such as for example, a valve or flow restrictor that is used to control the flow of fluid through the connector when the connector is in a connected state. Often, these types of quick connectors are manufactured with the flow control devices built into, and integrated with, the structure of the connector. In such arrangements, a particular variety or type of quick connector is required to be used to perform a particular flow function. For example, in applications requiring only one-way fluid flow a type of quick connector having a one-way valve device fitted in the flow channel of the connector would be used. In another application, restricting the amount of fluid flowing through the connector would require a different type of flow device to be built into the fluid channel of the connector. Therefore, manufactures of quick connectors often are forced to manufacture a large variety of the quick connector types in order to satisfy a particular fluid flow application. It would be desirable, to provide a single quick connector adapted to accept a replaceable flow control insert in the flow channel of the connector allowing a single quick connector to perform a different fluid flow function.

SUMMARY

This disclosure is directed to a quick connector having a modular flow control insert.

In a first embodiment, an assembly is provided that includes a receptacle having a first and a second interior passage providing a path for fluid flow between the first and the second interior passage. A chamber is formed in the receptacle in fluid communication between the first and the second interior passage. A flow control insert is installed in the chamber that regulates the fluid flow between the first and the second interior passages.

In a second embodiment a connector is provided that comprises a receptacle having a first and a second interior passage including a chamber in fluid communication between the first and the second interior passages. An insert for controlling the flow of fluid between the first passage and the second passage is installed in the chamber.

In a third embodiment, a process for controlling the flow of a fluid in a connector is provided. The process includes providing a receptacle having a first and a second interior passage and a chamber in fluid communication between the first and second interior passage. The process further includes installing a flow control insert into the chamber to regulate fluid flow between the first and the second passage.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The purpose of the present disclosure is to incorporate a modular flow control insert, such as for example a valve into a quick connector package to provide additional functionality to the connector. The disclosure of the present embodiment will be explained using a flow control insert in the form of a "float valve" or "liquid discriminator" which allows vapors through the valve but blocks the flow of a liquid, such as for example, to avoid liquid fuel from getting into and contaminating the vapor recovery system of a vehicle during refueling. However, the modular concept of the present disclosure can also be applied using different types of valves, regulators, or other flow control devices that can be used with the quick connector of the present embodiment to provide functions for different use specifications to be met with the same molded connector parts.

Figure 1:
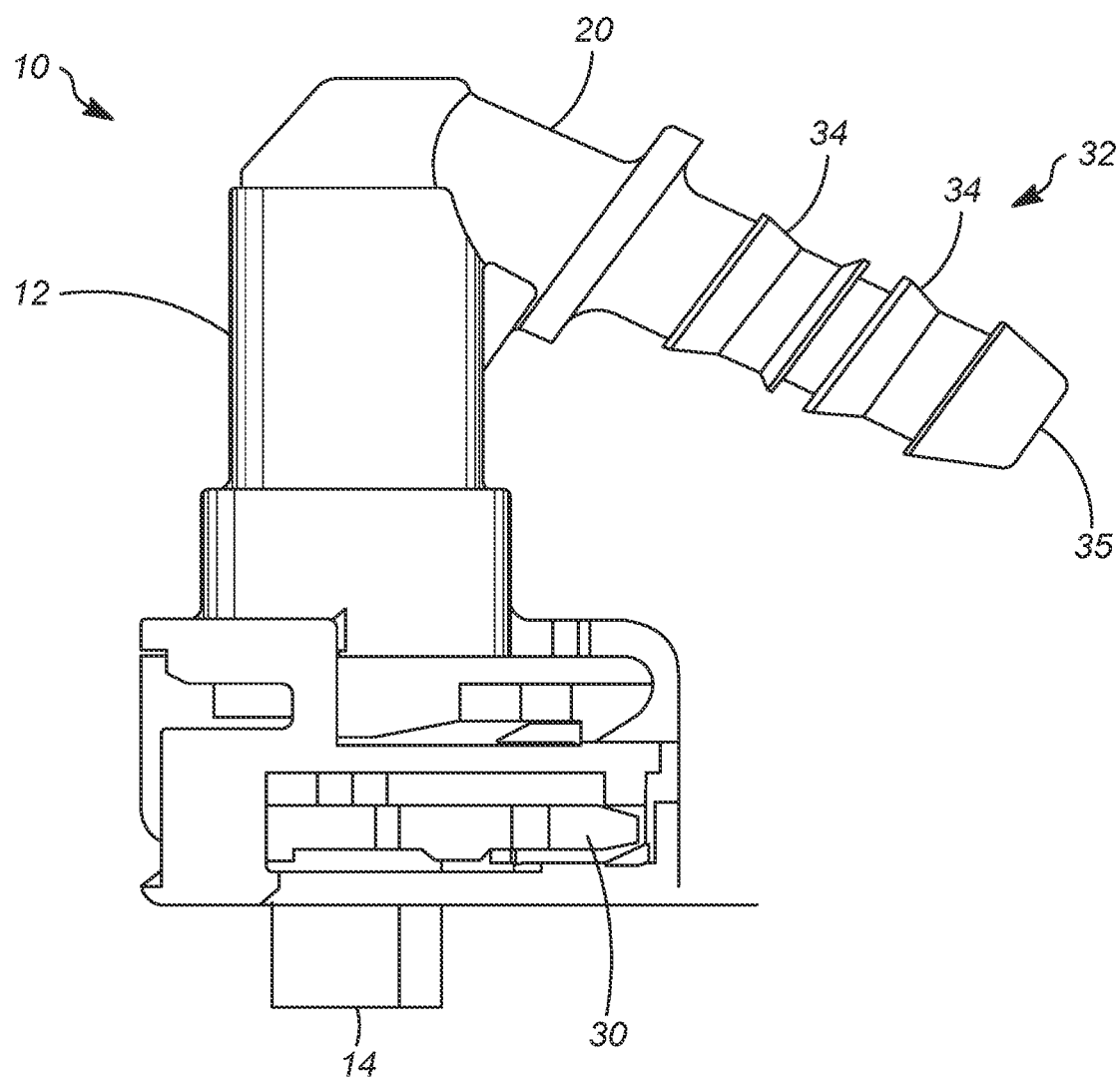
FIG. 1 illustrates a side exterior view of an example quick connector according to this disclosure.
Figure 2:
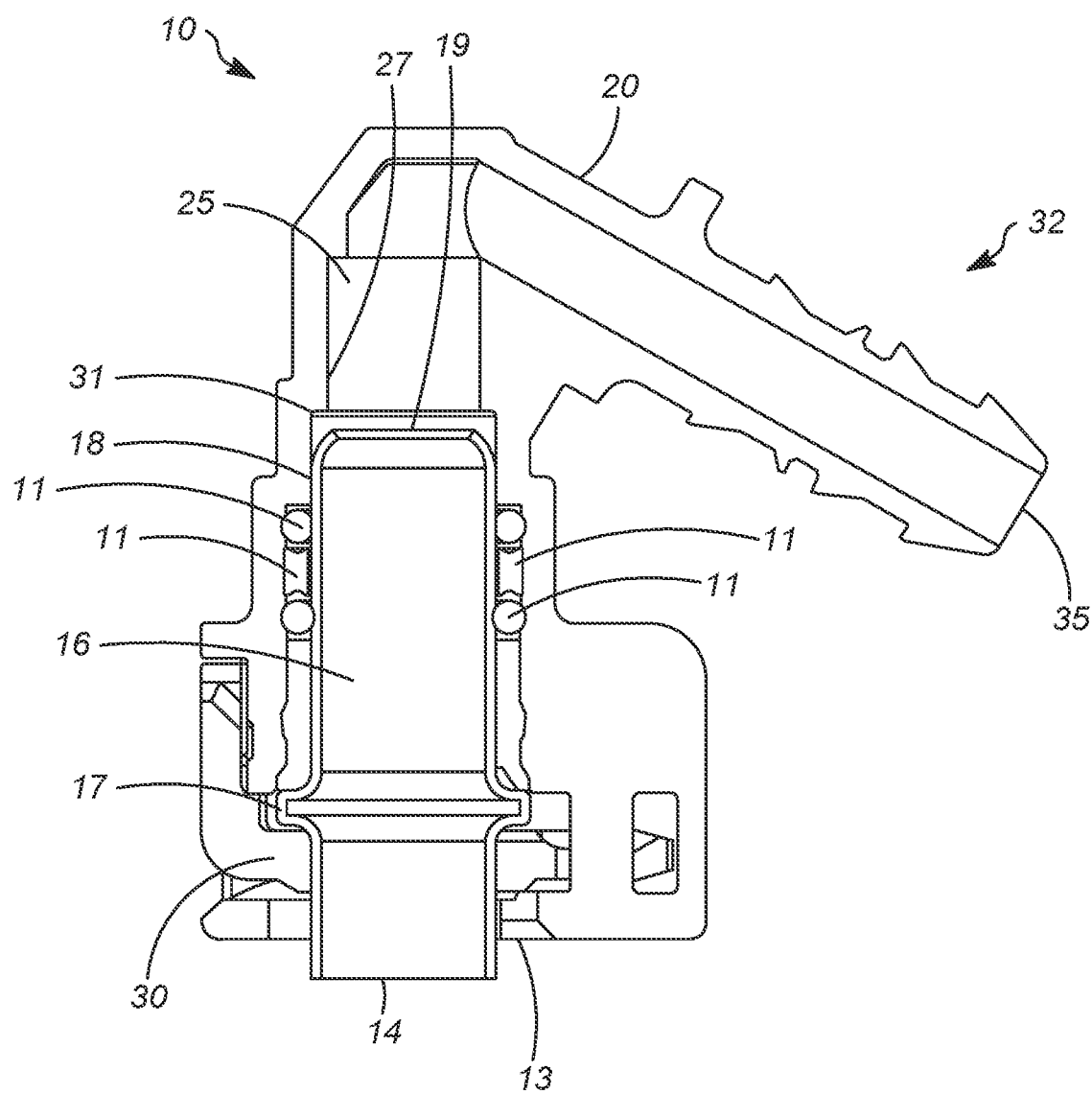
FIG. 2 illustrates a sectional view of the example quick connector of FIG. 1 according to this disclosure.

With reference to FIGS. 1 and 2, an exemplary quick connector 10 of the present disclosure is shown. The quick connector 10 provides a fluid tight connection between two fluid lines or tubes. A first tube 14 having an endform 16 is arranged to be inserted into a cylindrical and hollow first interior passage 18 located in the interior of a first end of receptacle 12. The receptacle 12 includes a second or coupling end 20 for coupling the quick connector 10 to a second tube or to a device. The coupling end 20 may include a hollow male stem 32 having a second interior passage 35. The male stem 32 may include one or more barbed flanges 34 that can be friction fitted into the second tube (not shown), for example, to couple the quick connector 10 to the tube. The receptacle 12 further includes a locking device 30 that is arranged to be manually moved out of a locking position to allow endform 16 to be easily installed into passage 18. Once the endform 16 is installed in passage 18, the locking device 30 is manually moved into a locking position where it engages a retaining shoulder 17 located on endform 16, thereby locking the endform 16 in place in the quick connector 10. The endform 16 and first tube 14 can be quickly disconnected from the receptacle 12 by manually moving the locking device 30 from shoulder 17 and removing the first tube 14 and endform 16, thereby disconnecting the first tube 14 from quick connector 10.

With reference to FIG. 2, a sectional view through the quick connector 10 is shown. As can be seen, endform 16 is arranged to be installed into the first interior passage 18 of the receptacle 12 through an opening 13. A mouth portion 19 of endform 16 is inserted into first passage 18 through opening 13 until mouth 19 rests near shoulder surfaces 31. A series of O-ring seals 11 installed on the interior surface of the first passage 18 squeeze around endform 16 preventing leakage of fluid passing therethrough. The endform 16 is locked in position in the receptacle 12 by manually manipulating the locking device 30 to capture retaining shoulder 17, as explained above.

A flow insert chamber 25 is defined by a circumferential wall 27 that forms a cavity in the first passage 18 between coupling end 20 and shoulder surfaces 31. In this embodiment, a flow channel is formed between the mouth 19 of endform 16 into the chamber 25 and through the second passage 35 of male stem 32 of the coupling end 20 into a second tube installed over stem 32 or vice-versa. The coupling end 20 may extend at any convenient angle applicable to the intended use of receptacle 12, which means that the coupling end 20 can have a longitudinal axis that may extend from the axis of the receptacle 12, horizontally, at a 90 degree angle from the axis, or obliquely defining an angle between coupling end 20 and receptacle 12 that is not equal to 180 degrees.

Figure 3:
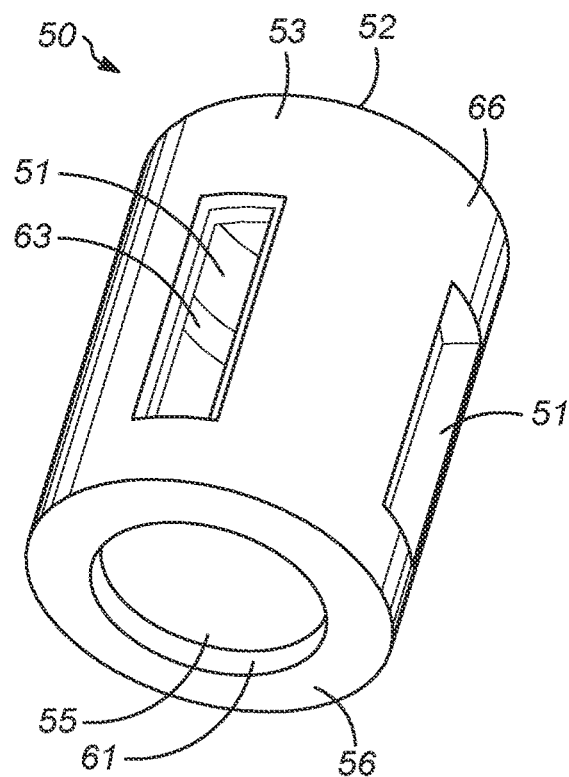
FIG. 3 illustrates a perspective view of an example modular flow control insert according to this disclosure.
Figure 4:
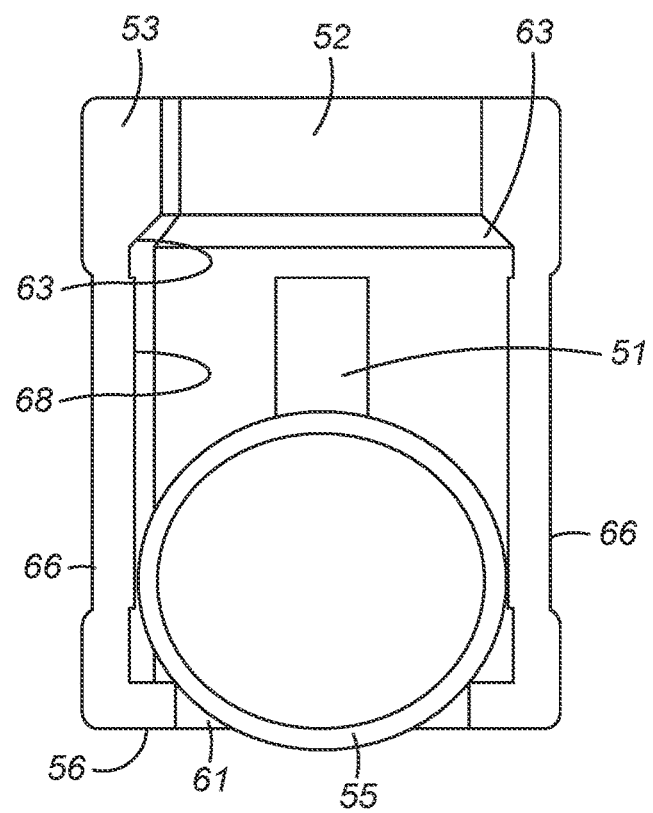
FIG. 4 illustrates a sectional view of the example modular flow control insert illustrated in FIG. 3 according to this disclosure.

Turning now to FIG. 3, a modular flow control insert of the type configured to be used in the present disclosure is illustrated. The exemplary modular flow control insert shown is a float valve 50. The float valve 50 is comprised of a hollow ball 55 contained in a cylindrical cage 66 by a retainer floor 56 and a head end 53. The ball 55 is designed to be lightweight and capable of floating on the surface of a liquid. A circular opening 61 is centrally located on retainer floor 56. Cage 66 includes openings 51 located around the periphery of cage 66 to allow fluid to flow therethrough. The head end 53 also includes a circular opening 52 located on a top surface of head end 53. As can be best seen at FIG. 4, the ball 55 is arranged to be housed within cage 66 and travel axially in the cage 66 along cylindrical interior walls 68. The head end 53 further includes sealing surfaces 63 located on an interior surface of the cage that are chamfered at a suitable angle to the ball 55 that allows the ball 55 to seal against the sealing surfaces 63. When liquid is not flowing in the quick connector 10 the ball 55 rests on the retainer floor 56 and partially extending though opening 61. Vapors or gasses entering opening 52 of the float valve 50, for example from the second interior passage 35, would flow around ball 52 into the first interior passage 18. The float valve 50 of the present invention is assembled as a unitary structure from a suitable metal or thermoplastic material. The unitary structure forms the modular flow control insert that can be fitted into insert chamber 25 of quick connector 10.

Figure 5:
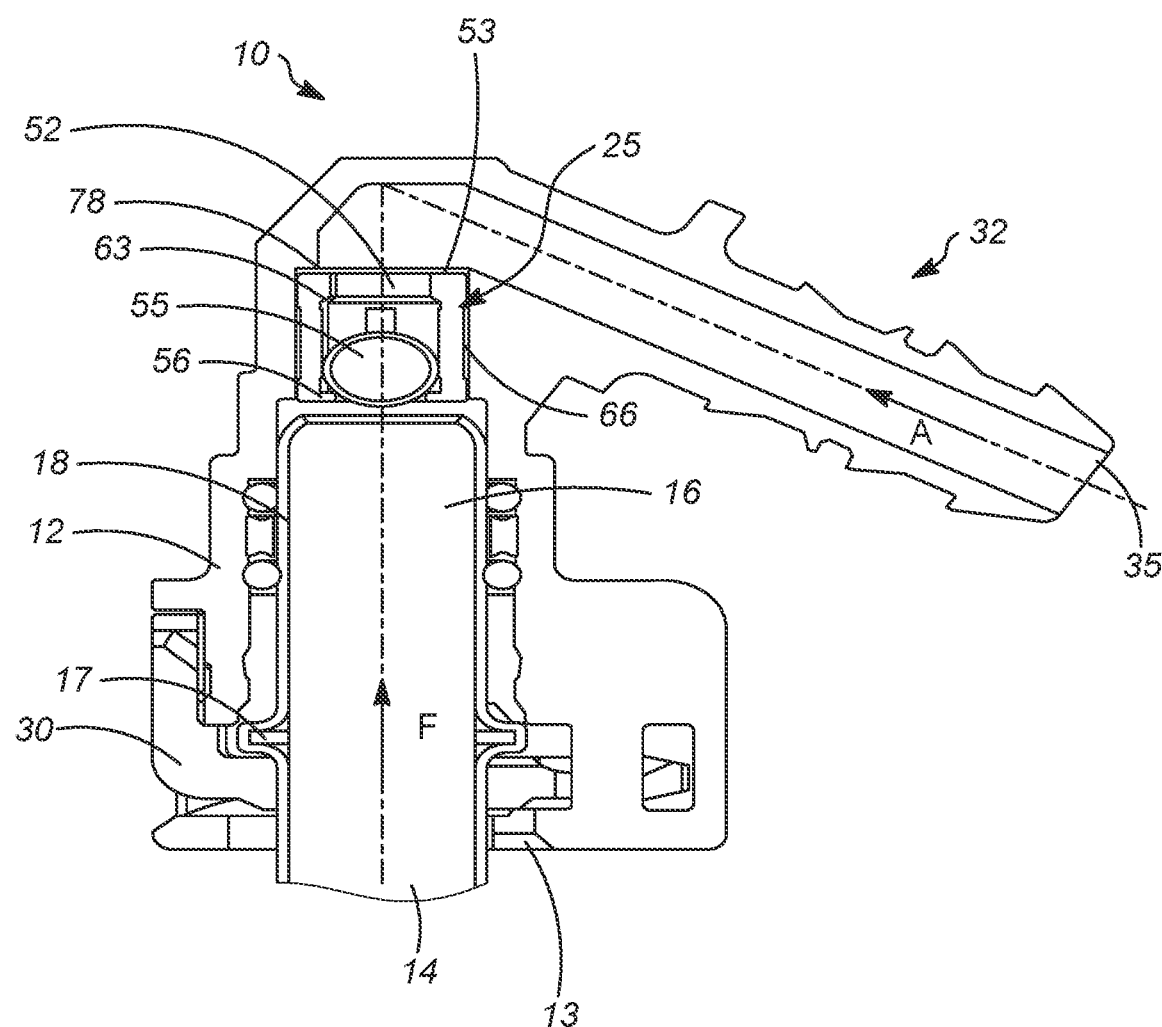
FIG. 5 illustrates a sectional view of the assembled quick connector showing the operation of the example modular flow control insert according to this disclosure.

As can be seen in FIG. 5 the fully assembled flow valve 50 of this disclosure is installed into quick connector 10 by inserting the valve 50 head end 53 into the first interior passage 18 through the opening 13 of the receptacle 12. The flow valve 50 is pushed up into the first interior passage 18 until it reaches and is accepted into the cavity formed by chamber 25. The head end 53 of flow valve 50 rests against stop surface 78 formed at the top end of chamber 25. The outer walls of cage 66 engage and make a liquid tight friction fit with the chamber 25 walls 27. Once the flow valve 50 is installed into the cavity formed by chamber 25, the first interior passage 18 is open to accept the endform 16 therein to form a fluid connection between the first and second tubes.

With renewed reference to FIG. 5, the operation of the exemplary float valve 50 of the present disclosure will be explained. The float valve 50 installed in quick connector 10 of this embodiment is arranged stop the flow of liquid entering the second interior passage 35 from the first interior passage 18, such as for example, to block liquid fuel from entering the vapor recovery system of a vehicle during refueling. In normal operation, the second tube (not shown) is installed on stem 32 connecting a vehicles vapor recovery system to quick connector 10. Vapors and other gases from the vapor recovery system flow in the direction of arrow A and enter stem 32 via the second interior passage 35. The vapors enter opening 52 of the float valve and travel through float valve 50 and exit over ball 55 through opening 61 into endform 16 and out through tube 14. As was explained earlier, the ball 55 rests on retainer surface 56 loosely, allowing vapors and gasses to flow around ball 55 and exit opening 61.

However, if a vehicle's fuel tank is over-filled allowing fuel to enter the vehicles overflow tube, liquid fuel enters endform 16 from tube 14, in the direction of arrow F. Liquid fuel would enter opening 61 of the float valve 50, causing ball 55 to float and ride on the liquid fuel and travel axially along interior walls 68 until reaching sealing surfaces 63. The ball 55 by engaging against sealing surfaces 63 seals the second interior passage 35 from the liquid fuel and stops the flow of liquid fuel from tube 14 into the second interior passage 35. Further fuel flow or flow pressure would increase the force exerted by the ball 55 against sealing surfaces 63. In this embodiment, the float valve 50 modular insert effectively stops liquid fuel from entering into second passage 35 and contaminating a vehicles vapor recovery system.

In this exemplary embodiment the modular flow control insert used with quick connector 10 has been described as a float valve, it will be understood by those skilled in the art that other types of flow regulating inserts can be equally applied to the cavity of insert chamber 25 to provide functions for different use specifications to be met with the same molded connector parts.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A quick connector assembly comprising:
a receptacle having a first and a second interior passage that provides a path for fluid to flow between the first and the second interior passage;
a chamber in fluid communication between the first and the second interior passage; and
a flow control insert installed in the chamber, the flow control insert including:
a cage having a floor and a head end the floor including an opening;
a ball housed within the cage resting in the floor opening allowing a gaseous fluid to flow from the second interior passage to the first interior passage; and
an opening in the cage head end,
wherein the ball is movable to the head end opening to block a liquid fluid from flowing out of the flow control insert to the second interior passage.

2. The quick connector assembly of claim 1, wherein the receptacle includes a first end having an opening the first end containing the first interior passage.

3. The quick connector assembly of claim 2, wherein the receptacle includes a stem extending from a second end of the receptacle, the stem containing the second interior passage and arranged to accept a second tube on the stem.

4. The quick connector assembly of claim 3, wherein the chamber is a cylindrical cavity open to the first and the second interior passages.

5. The quick connector assembly of claim 4, wherein the flow control insert is arranged to be installed in the cavity through the opening of the connector first end and through the first interior passage.

6. The quick connector assembly of claim 5, wherein the first interior passage is arranged to receive a first fluid tube within the first passage through the opening.

7. The quick connector assembly of claim 6, wherein the flow control insert regulates fluid flow between the first tube and the second tube.

8. A quick connector comprising:
a receptacle having a first and a second interior passage and a chamber in fluid communication between the first and the second interior passage; and
a flow control insert installed in the chamber, the flow control insert including a ball housed within a cage having a floor opening and a head opening and in a first position the ball rests in the floor opening that allows gaseous fluid to flow from the second interior passage to the first interior passage through the flow control insert and the ball movable within the cage to a second position at the head end opening to block liquid fluid from flowing out of the flow control insert to the second interior passage,
wherein the receptacle includes a first end having an opening to the first interior passage and the flow control insert is installed in the chamber through the receptacle first end opening and the first interior passage.

9. The quick connector of claim 8, wherein the receptacle includes a stem extending from a second end of the receptacle, the stem containing the second interior passage and arranged to accept a second tube on the stem.

10. The quick connector of claim 9, wherein the chamber is a cylindrical cavity open to the first and the second interior passages.

11. The quick connector of claim 8, wherein a first fluid tube is installed in the first interior passage through the receptacle first end opening.

12. The quick connector of claim 11, wherein the flow control insert regulates fluid flow between the first tube and the second tube.

13. A process for controlling the flow of a fluid in a quick connector comprising:
providing a receptacle having a first and a second interior passage;
providing a chamber in fluid communication between the first and second interior passage; and
installing a flow control insert into the chamber, the flow control insert having a ball housed in a cage, the cage having a floor opening and a head end opening and in a first position the ball rests in the floor opening that allows a gaseous fluid to flow through the flow control insert from the second interior passage to the first interior passage and the ball movable in the cage to a second position at the head end opening that blocks liquid fluid from flowing out of the flow control insert to the second interior passage.

14. The process of claim 13, wherein the receptacle includes a first end having an opening the first end containing the first interior passage and the chamber is a cylindrical cavity open to the first and the second interior passages, the process further including:
installing the flow control insert in the cavity through the opening of the connector first end through the first interior passage.

15. The process of claim 14, wherein the receptacle includes a stem extending from a second end of the receptacle, the stem containing the second interior passage, the process further including:
installing a second tube on the stem.

16. The process of claim 15, further including installing a first tube in the interior passage through the opening.

17. The process of claim 16, wherein the flow control insert regulates fluid flow between the first tube and the second tube.

* * * * *